UNITED STATES PATENT OFFICE.

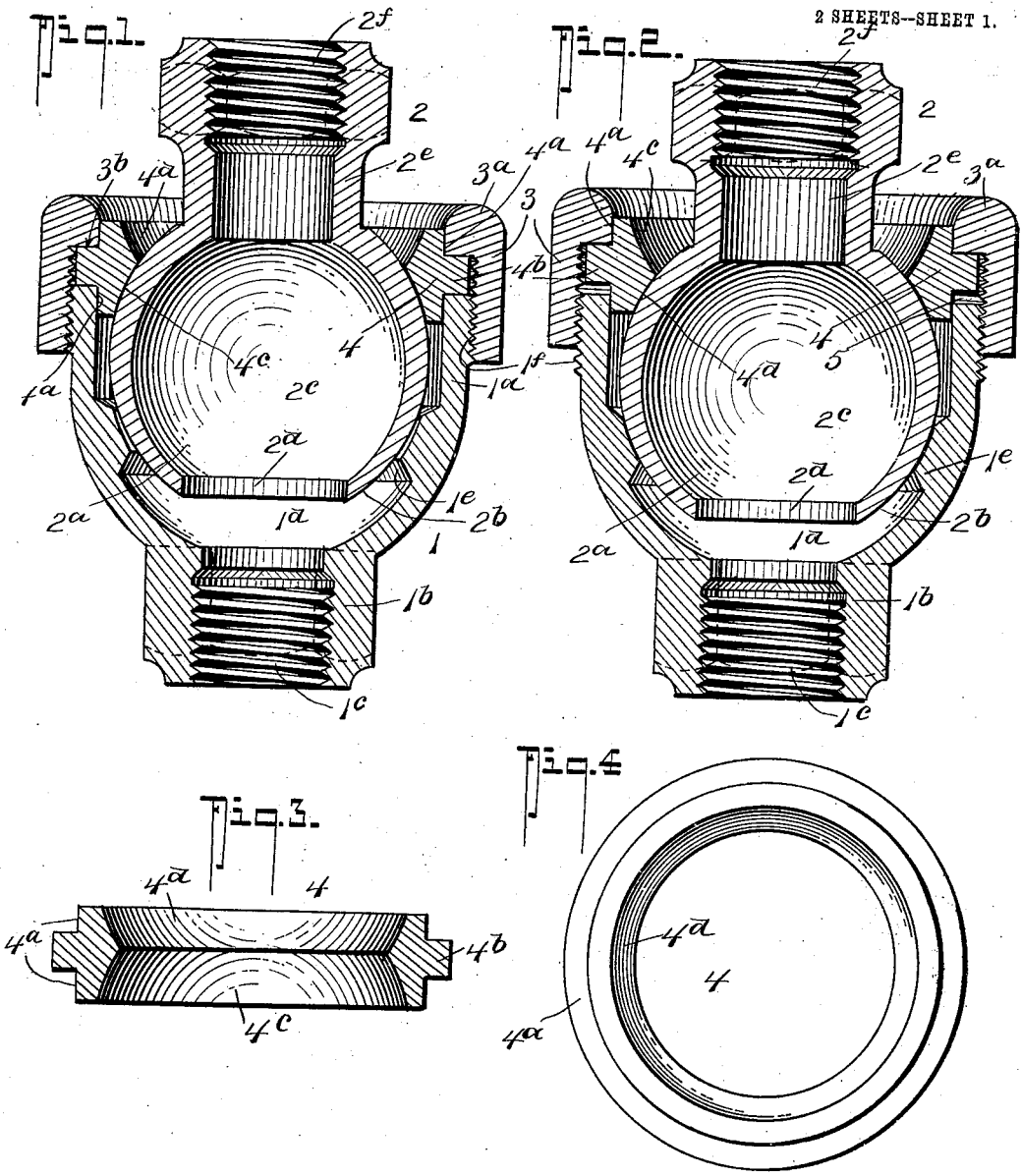

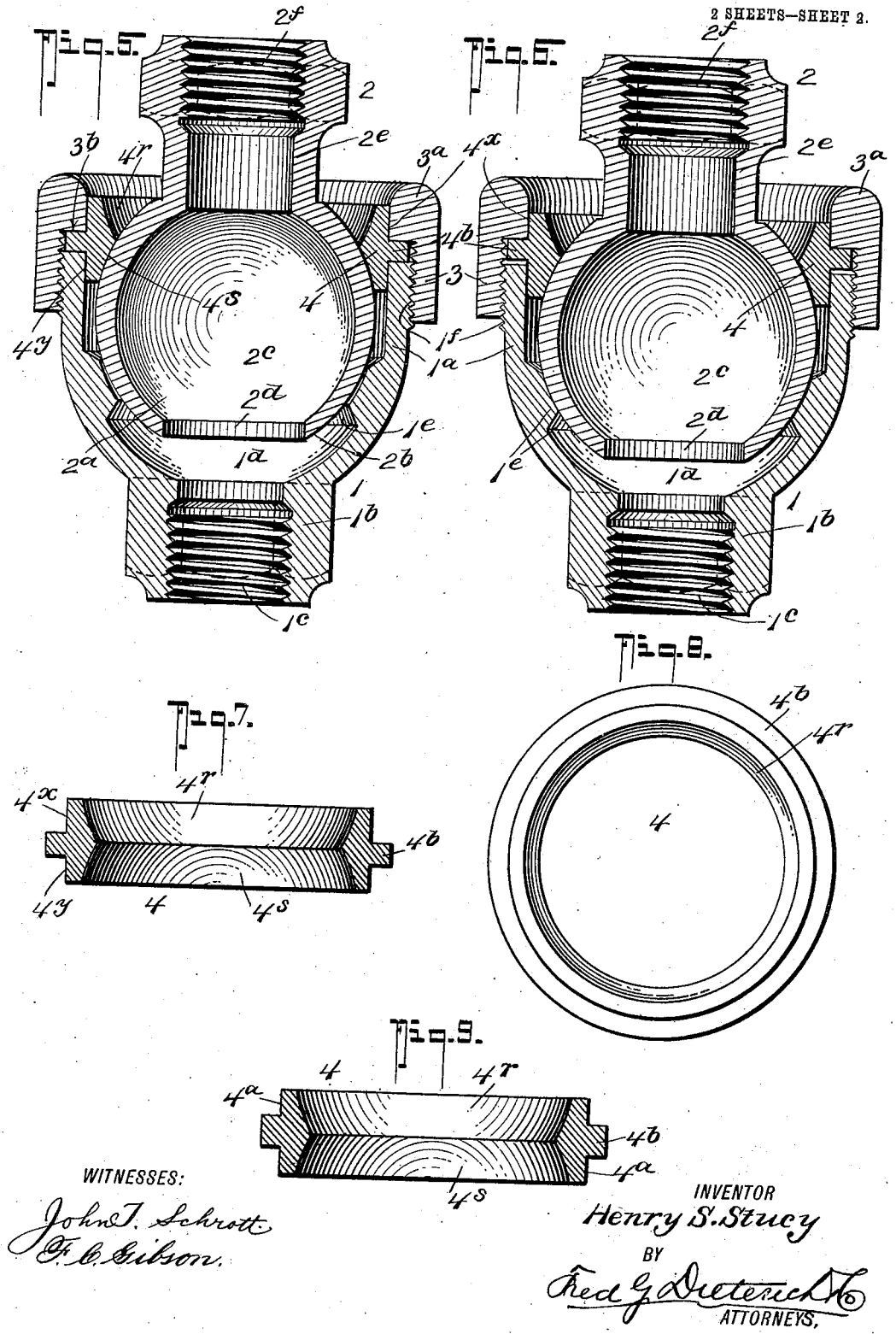

HENRY S. STUCY, OF LOUISVILLE, KENTUCKY.

PIPE-COUPLING.

No. 845,141.     Specification of Letters Patent.     Patented Feb. 26, 1907.

Application filed September 6, 1906. Serial No. 333,556.

*To all whom it may concern:*

Be it known that I, HENRY S. STUCY, residing at Louisville, in the county of Jefferson and State of Kentucky, have invented a new and Improved Pipe-Coupling, of which the following is a specification.

My invention relates to certain new and useful improvements in flexible pipe-joints of the type having provisions in virtue of which the joint can be used either as a steam-pipe joint or as a liquid-pipe joint, as may be found desirable.

Primarily my invention has for its object to provide a coupling of this character which can be easily and cheaply manufactured and which will readily and effectively serve its intended purposes and in which the parts are so arranged and constructed as to be easily renewed when worn.

Generically my invention comprises a novel bearing-ring for coöperating with the ball and ball bearings of a ball-and-socket joint and means for securing the ring in place.

With other objects in view than have been heretofore specified the invention also includes certain novel combination, arrangement, and construction of parts, all of which will be first described in detail and then be specifically pointed out in the appended claims, reference being had to the accompanying drawings, in which—

Figure 1 is a central vertical longitudinal section of one form of my invention, showing the position of the parts when adjusted for a loose joint. Fig. 2 is a similar view showing the parts adjusted for a tight joint. Fig. 3 is a sectional view of the bearing-ring. Fig. 4 is an end view thereof. Fig. 5 is a view similar to Fig. 1, showing a modified form of my invention. Fig. 6 is a view similar to Fig. 2, showing the form of my invention disclosed in Fig. 5. Fig. 7 is a sectional view of the bearing-ring shown in Fig. 5. Fig. 8 is an end view thereof. Fig. 9 is a sectional view of a further modification of bearing-ring.

Referring now to the accompanying drawings, in which like numerals and letters of reference indicate like parts in all of the figures, 1 designates the socket member of the coupling, which comprises a bell $1^a$ and a stem $1^b$. The stem $1^b$ is tapped at $1^c$, and has its outer face provided with a nut portion, as indicated. The bell $1^a$ has an internal chamber $1^d$ and an internal bearing-flange $1^e$, which coöperates with the outer bearing-face $2^b$ of the ball $2^a$ of the ball member 2 of the joint. The bell $1^a$ also has an external thread $1^f$ at its mouth to receive an annular securing-collar 3, as shown. The collar 3 has an end flange $3^a$, having a shoulder $3^b$ for purposes presently understood. The ball member 2 has an internal chamber $2^c$, whose mouth $2^d$ communicates with the internal chamber of the bell $1^e$, the ball member also including a neck $2^e$, tapped as at $2^f$ and formed with an external nut portion, as clearly shown in the drawings.

4 designates a bearing-ring which in the type of my invention shown in Fig. 1 is annular and has its outer face $4^a$ of a diameter to snugly fit within the bell-mouth. The ring 4 has its outer face divided into two equal parts by an annular flange $4^b$, which fits over the end of the bell-mouth and is secured in place by the collar 3, whose shoulder $3^b$ engages the flange $4^b$, as shown. The bearing-ring in this form of my invention has two spherical bearing-faces $4^c$ and $4^d$, respectively, of different or unequal areas, although both are curved on equal radii of curvature.

When it is desired to use my coupling as a steam-pipe joint, then the parts are in the position shown in Fig. 1, with the ring 4 held to have its face $4^c$ engaged by the spherical bearing-surface of the ball, while the ball is held out of engagement with the bearing-faces of the flange $1^e$ by the steam-pressure, as is well understood in the art, the coupling in this intance being loose. When, however, it is desired to convert my coupling for use under low-pressure-pipe systems—such, for instance, as coupling for water-pipes—then the ring 4 is reversed to bring its bearing-surface $4^d$ of lesser degree into engagement with the ball, so as to cause the ball to seat both against such bearing-face $4^d$ and the bearing-face of the flange $1^e$, thus forming a water-tight joint, such as is shown in Fig. 2 of the drawings, it being understood that when the parts are in the position shown in Fig. 1 the flange $4^b$ of the ring 4 is in contact with the end face of the bell, while when the parts are in the position shown in Fig. 2 a space 5 is left between the flange $4^b$ and the bell. This is to enable any wear on the smaller bearing-surface $4^d$ to be compensated for by the collar 3, which can be screwed down on the bell more and more as the ring-surface $4^d$ wears down, so as to always maintain a tight joint.

In the form of my invention shown in Figs. 5 to 8, inclusive, the ring 4 has both bearing-faces of equal area, as at $4^r$ and $4^s$, while the outer wall of the ring 4 is divided by the flange $4^b$ into two portions of unequal area and length, as at $4^x$ and $4^y$, so that when the parts are adjusted as shown in Fig. 5 the flange $4^b$ engages the bell edge and the ball has its bearing-surface held in engagement with the spherical bearing-surface $4^s$ of the ring 4 and out of engagement with the bearing-surface $1^e$ of the bell by the fluid-pressure.

When the parts are to be used as a coupling for low-fluid-pressure (water, &c.) pipe, then the ring 4 is reversed, as before, and adjusted, as shown in Fig. 6, to make a fluid-tight joint.

In both forms of my invention the ball member has a motion in all directions from alinement with the socket member of about twenty degrees.

From the foregoing it will be seen that in both the forms of my invention shown in Figs. 1 and 5 the principle of operation of the ring 4 is the same. In the one case the unequal area of the spherical bearing zones performs the differential function necessary, while in the other case such function is performed by the unequal external face of the ring.

When it is desired to supply coupling to the trade for use either as a steam-pipe coupling or as a water-pipe coupling alone, the ring 4 may be made with both its spherical bearing-surfaces $4^r$ and $4^s$ equal in area—as in Fig. 5, for instance—and also both portions $4^a$ of the outer surface of the ring may be made equal—as, for instance, in Fig. 1. Thus when one surface $4^r$ wears down the ring may be reversed and the other surface $4^s$ used before it becomes necessary to renew the bearing-ring. This form of ring with equal bearing-surfaces and equal external surfaces is shown in Fig. 9 of the drawings.

From the foregoing description, taken in connection with the accompanying drawings, it is thought the complete construction, operation, and numerous advantages of my invention will be readily understood by those skilled in the art to which it appertains, and I desire to say that numerous slight changes in the detailed construction, combination, and arrangement of parts may be readily made without departing from the scope of the invention or the appended claims.

Having thus described my invention, what I claim, and desire to secure by Letters Patent, is—

1. The combination with a ball member and a bell member; of a reversible bearing-ring held in the mouth of the bell and having a pair of spherical bearing-surfaces, and an annular flange on its external surface and a collar held over the ring-flange and having a threaded engagement with the bell.

2. The combination with the ball member and the bell member, of a reversible bearing-ring held in the mouth of the bell and having a pair of spherical bearing-surfaces, and an annular flange on its external surface, dividing the external surface into unequal zones, and a collar held over the ring-flange and interlocking with the bell.

3. The combination with the ball member and a bell member, said bell member having a bearing-flange on its inner surfaces to cooperate with the ball, when the members are under one adjustment, of a reversible bearing-ring held in the mouth of the bell, and having a pair of spherical bearing-surfaces and an external flange, said ring having a pair of unequal external surfaces, one on each side of the flange, and a collar having shoulders for engaging the ring-flange, and having a portion held over the bell-mouth and secured thereto, substantially as shown and described.

4. The combination with a ball member and a bell member; of a reversible bearing-ring having an external flange, an annular collar secured over the bell member and having shoulders for engaging the ring-flange, said ring having provisions in virtue of which, when the ring is in one position a tight coupling is obtained and when the ring is in its reversed position a loose coupling is obtained, substantially as shown.

HENRY S. STUCY.

Witnesses:
  WM. H. PANK,
  A. A. GIES.